United States Patent [19]
DeLuca et al.

[11] Patent Number: 5,399,956
[45] Date of Patent: Mar. 21, 1995

[54] BACKUP BATTERY SYSTEM FOR A PORTABLE ELECTRONIC DEVICE

[75] Inventors: Michael J. DeLuca, Boca Raton; Mark L. Oliboni, Boynton Beach; George A. Drapac, Boca Raton, all of Fla.

[73] Assignee: Motorola, Inc., Schaumburg, Ill.

[21] Appl. No.: 829,833

[22] Filed: Feb. 3, 1992

[51] Int. Cl.⁶ ............................................. G05F 1/46
[52] U.S. Cl. ..................... 323/222; 363/59; 307/66; 320/38; 320/47; 320/50
[58] Field of Search ............... 323/222, 224, 269, 268, 323/271, 272; 320/21, 43, 45, 50, 2, 20, 29, 37, 38, 47, 56, 28; 363/59; 307/64, 66

[56] References Cited

U.S. PATENT DOCUMENTS

| | | | |
|---|---|---|---|
| 3,560,832 | 2/1971 | Kirk | 320/56 |
| 3,959,706 | 5/1976 | Mabuchi et al. | 320/2 |
| 4,025,860 | 5/1977 | Shibata et al. | 320/3 |
| 4,143,417 | 3/1979 | Wald et al. | 364/900 |
| 4,160,941 | 7/1979 | Bennett | 320/56 |
| 4,433,277 | 2/1984 | Carollo et al. | 320/24 |
| 4,443,752 | 4/1984 | Newman | 320/22 |
| 4,538,101 | 8/1985 | Shimpo et al. | 323/272 |
| 4,606,076 | 8/1986 | Davis | 455/343 |
| 4,634,956 | 1/1987 | Davis et al. | 323/222 |
| 4,638,236 | 1/1987 | Carr et al. | 320/21 |
| 4,661,759 | 4/1987 | Klein | 320/48 |
| 4,665,473 | 5/1987 | Onda et al. | 363/21 |
| 4,673,865 | 6/1987 | DeLuca et al. | 323/222 |
| 4,878,007 | 10/1989 | Gabor et al. | 320/14 |
| 4,979,205 | 12/1990 | Haraguchi et al. | 379/61 |
| 5,028,861 | 7/1991 | Pace et al. | 323/222 |
| 5,233,283 | 8/1993 | Kennedy | 320/13 |

Primary Examiner—Steven L. Stephan
Assistant Examiner—Adolf Berhane
Attorney, Agent, or Firm—D. Andrew Floam

[57] ABSTRACT

In a device having a primary battery 10, a first voltage multiplier 20 is used to power digital electrical circuits 40 from the primary battery, and a second voltage multiplier 100–136 is used to recharge a backup battery 50 from the primary battery. The backup battery is charged to a voltage greater than the voltage generated by the first voltage multiplier. Methods of controlling the second voltage multiplier reduce its interference in measurement of device parameters, and reduce the power consumed from the primary battery.

15 Claims, 4 Drawing Sheets

BACKUP BATTERY SYSTEM FOR A PORTABLE ELECTRONIC DEVICE

FIELD OF THE INVENTION

This invention relates generally to a low power portable electronic device, such as a pager, having a primary battery for powering the device and a backup battery for powering the device upon removal of the primary battery. More specifically, this invention relates to the charging of the backup battery from the primary battery in such a device.

BACKGROUND OF THE INVENTION

As portable electronic devices, such as pagers, become more advanced, additional digital features are being incorporated within. For example, some modern pagers now include clock functions for keeping the time of day, as well as large volatile digital memory circuits (or RAM) for storing accumulated message information. Since such devices are portable, they operate on a primary battery. In the event of the absence of power from the primary battery, either by the battery going dead or the battery being removed by the user for the purpose of inserting a new battery, devices without backup battery functions loose important digital information such as the time of day and accumulated information stored in volatile memory. Conventionally, in order to protect against this loss of information, a backup battery has been used to provide power for the device when power from the primary battery is absent.

Prior art backup battery systems include systems which use long life lithium batteries. However, such batteries are large and therefore difficult to incorporate within miniature portable electronic devices, such as pagers. Also, such batteries do not store sufficient energy to provide for backup functions over the expected life of the product. Thus, the backup battery would need to be periodically replaced. This results in an inconvenience to the user of the device, as well as the additional expense of providing a means for easy removal and replacement of the backup battery. Therefore, it is desirable to use a rechargeable backup battery which may be both smaller in size, thereby providing for improved miniaturization, and permanently installed within the device, thereby eliminating the inconvenience of replacement and the means for replacement. Known pagers have incorporated rechargeable backup batteries. FIG. 1 represents a known pager incorporating a rechargeable backup battery. Primary battery 10, is a common removable AA or AAA battery having a DC output voltage ranging from 1.7 when new to 1.0 when discharged or dead. Voltage multiplier 20 boosts the battery voltage to a regulated 2.6 volt output 30. The operation of the voltage multiplier 20 is described in detail in U.S. Pat. Nos. 4,606,076 and 4,634,956 both to Davis et al, and assigned to the assignee of the present invention. Control 22 generates an 83 kHz duty cycle modulated signal which drives switching transistor 23 which either grounds or floats inductor 24. When floating, the fly-back energy of inductor 24 is conducted to diode 27 and stored on capacitor 28. Control 22 modulates the duty cycle of the signal in order to maintain a regulated 2.6 volt output. Under normal loads, inductor 24 operates in "continuous conduction", thereby producing an 83 kHz waveform at node 29 having a low voltage of ground and a high voltage a diode drop greater than the 2.6 volt regulated output voltage at node 30. Thus, the waveform at node 29 is substantially a 2.6 volt peak to peak waveform.

Decoder 40 receives operating power from node 30 at input 32. Although decoder 40 is capable of operating at voltages higher than 2.6 volts, operating the decoder at a reduced voltage reduces the power consumed from the primary battery, thereby extending the battery life. Decoder 40 includes a microcomputer for performing paging functions well known to those familiar with the art, such a decoder is described in U.S. Pat. No. 4,835,777 to DeLuca et al, and assigned to the assignee of the present invention. Decoder 40 sends a signal to control means 22 through line 42 indicating whether voltage multiplier 20 is to operate in a high or low power mode. The high power mode indicates that a high power load connected to node 30 may be enabled, the high power load may result from operating the decoder at a substantially higher clock speed for certain decoding functions. The high power mode causes control 22 to provide additional base drive current to transistor 23. Otherwise the low power mode is used resulting in reduced base drive current in transistor 23, thereby conserving power drawn form primary battery 10.

Decoder 40 also receives and processes paging signals having address and subsequent message information modulated upon RF signals received and demodulated by receiver 45. In response to the detection of a predetermined address, decoder 40 then stores subsequent message information in volatile memory (not shown) within decoder 40 and displayed on display 48. Decoder 40 also comprises a means for keeping time of day and date information (not shown).

Backup battery 50 is fixed within the pager and supplies operating power to decoder 40 when power from the primary battery is no longer available. Backup battery 50 is preferably a rechargeable lithium battery such as part number SL621, manufactured by Seiko Instruments, Inc. Power to recharge battery 50 passes through resistor 52 which limits the current drawn from node 30. The recharge voltage of battery 50 approaches the regulated voltage at node 30 as the voltage across resistor 52 approaches zero. Thus, the maximum charged voltage of the backup battery is the voltage of node 30 when the voltage across resistor 52 equals zero.

Battery absent detector 60 detects the unavailability of power from the primary battery and switches transistor 62 on, thereby providing power from the backup battery 50 to node 30. Battery absent detector also sends an absent signal 64 to decoder 40 indicating the absence of power from the primary battery, thereby causing the decoder to operate in a low power mode while maintaining message information stored in the volatile memory and time keeping functions. When power is again available from the primary battery, detector 60 sends a present signal 64 to decoder 40 and normal paging operations are resumed. Absence detector 60 also senses the voltage of backup battery 50 and supplies a reset signal 64 to decoder 40 indicating that the voltage is too low to guarantee proper decoder operation. This voltage is typically 2.2 volts. In response, decoder 40 erases messages in volatile memory and resets the time keeping functions.

Thus, during backup operation, the prior art backup battery system provided for the battery voltage to range from 2.6 to 2.2 volts before backup operations are terminated by the decoder and important information is reset.

Since this range corresponds to the time the pager operates in the backup mode, it is desirable to increase this range in order to increase the time a pager can operate in the backup mode. Also, it is desirable to increase the electrical functionality while the device is operating from the backup battery. Such increased functionality includes the display of time information or other status information on display 48 when the primary battery is removed or dead. This increased functionality draws extra power from the backup battery, thus it is desirable to provide a backup battery system having improved backup battery capacity.

Also, at times users replace a dead primary battery with a weak primary battery thereby allowing insufficient time for recharging the backup battery before the weak primary battery is itself dead. Thus, what is needed is a backup battery charging system capable of rapidly recharging a backup battery from a primary battery. Also, the backup system should not interfere with the measurement of operating parameters of the device, such as measurement of current drain or radio characteristics.

SUMMARY OF THE INVENTION

In accordance with a first embodiment of the present invention, an apparatus comprises: a primary power source means for producing at least a regulated voltage; a voltage multiplying means coupled to and drawing power from said primary power source means, said voltage multiplying means for producing a limited voltage greater than any voltage produced by said primary power source; a rechargeable battery coupled to said voltage multiplying means, the rechargeable battery recharging to a voltage substantially equal to the limited voltage; and an electrical circuit means selectively powered by said primary power source in response to the presence of the primary power source, and selectively powered by said rechargeable battery in response to the absence of power from said primary power source.

DETAILED DESCRIPTION OF THE INVENTION

Figure 1:
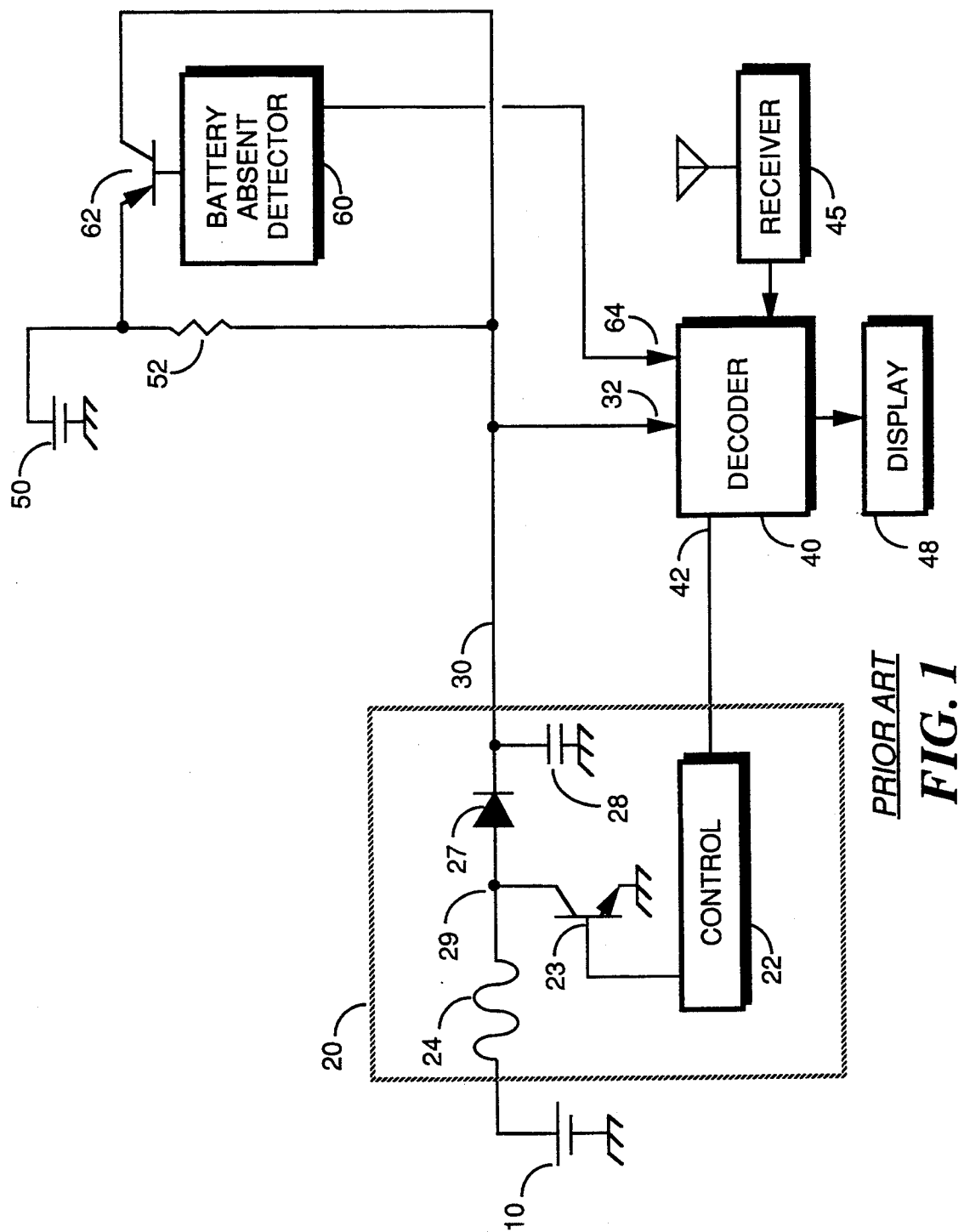
FIG. 1 shows a block diagram of a known pager incorporating a rechargeable backup battery.
Figure 2:
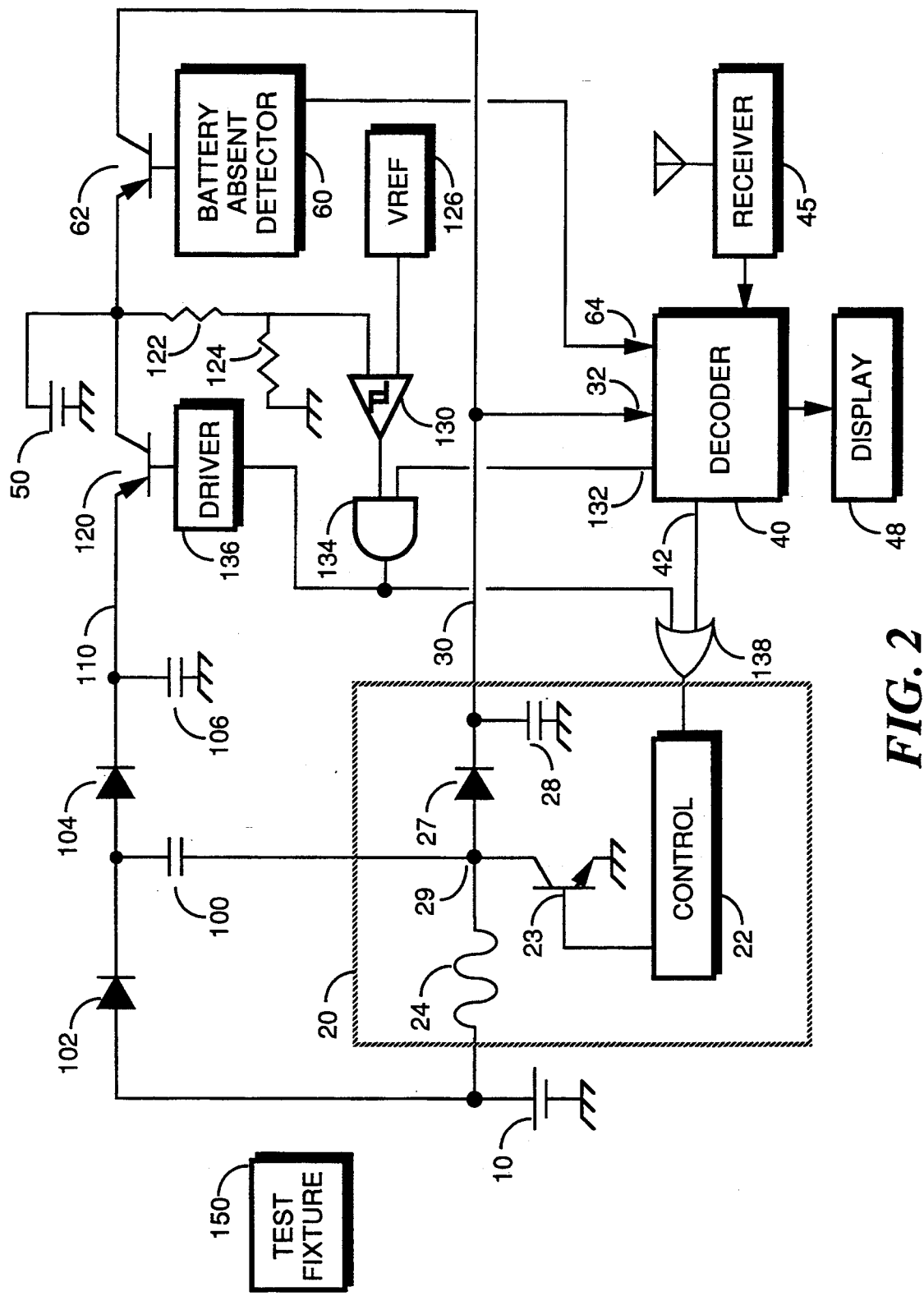
FIG. 2 shows a block diagram of the backup battery system of a first embodiment of the present invention.
Figure 3:
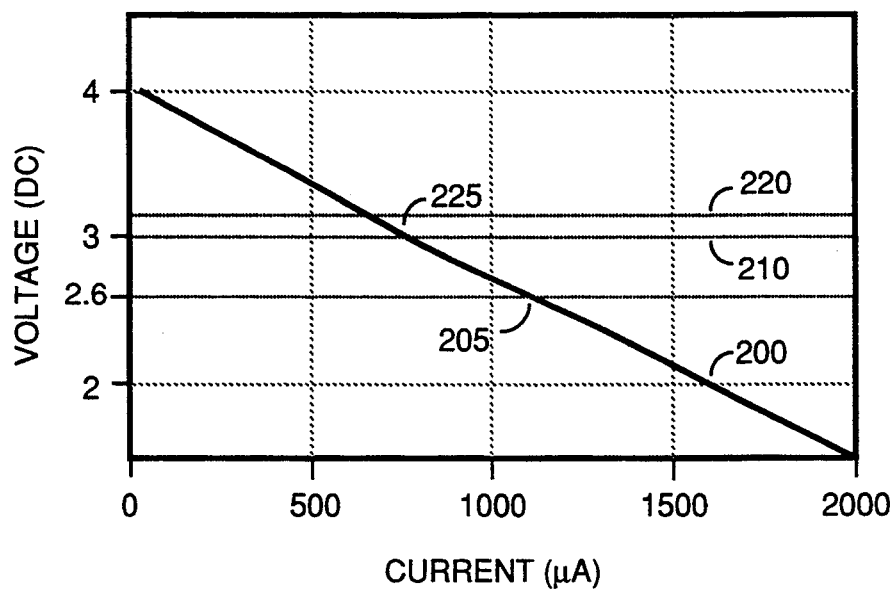
FIG. 3 shows a graphical representation of the voltage vs. current curve of a voltage multiplier.

FIG. 2 shows a block diagram of the backup battery system of the present invention. With the exception of the elimination of resistor 52, elements 10 through 64 operate substantially identically to corresponding elements 10 through 64 of FIG. 1. The charging system of the present invention uses a second voltage multiplier, elements 24 and 100–136 of FIG. 2, for charging backup battery 50, the second voltage multiplier being coupled into the first voltage multiplier 20 through capacitor 100. Capacitor 100 couples the 2.6 volt peak to peak waveform on node 29 to rectifying diodes 102 and 104. The anode of diode 102, being connected to the primary battery causes the peak to peak voltage coupled through capacitor 100 to be added to the primary voltage of the battery 10, and diode 104 rectifies the wave form to produce a voltage equivalent to the sum of the primary battery plus the peak to peak voltage. The rectified voltage is stored on capacitor 106. Under no load, the voltage on node 110 is substantially the sum of primary battery voltage 10 plus the regulated voltage on node 30. FIG. 3 shows that as a load is placed upon node 110, the voltage decreases as a function of the current drawn by the load.

FIG. 3 shows a graphical representation of the voltage vs. current curve of the second voltage multiplier. Curve 200 represents a capacitor 100 value of 0.01 μF, with a primary battery voltage of 1.4 volts. When transistor 120 is ON, the vertical axis of the graph of FIG. 2 represents the voltage of the backup battery 50 while the horizontal axis represents the current charging the backup battery. Point 205 of curve 200 shows that the second voltage multiplier is capable of supplying substantial charging current (over 1000 μA) at a backup battery voltage of 2.6 volts. In prior art FIG. 1, the charge current approached zero as the backup battery approached 2.6 volts. This increase in charging current results in the charging time of the backup battery of the present invention being substantially shorter. Furthermore, substantial additional backup power may be realized by charging the backup battery to a voltage greater than 2.6 volts, thereby providing increased backup operation time.

Referring back to FIG. 2, backup battery 50 has a desired maximum charge voltage of substantially 3.2 volts. The charging system of the present invention has a voltage limiting function. Backup battery 50 voltage is divided by resistors 122 and 124 and compared to reference voltage 126 by hysteresis comparator 130. Comparator 130 has substantially 100 mV of hysteresis and has a logical 1 output when the backup battery voltage is below 3.0 volts and a logical 0 output when the backup battery voltage is above 3.1 volts. Decoder 40 generates a charge enable signal 132, the timing of which will be described in FIG. 4. Signal 132 is ANDed with the output of comparator 130 by AND gate 134. When both the inputs to gate 134 are enabled, a logic 1, the output of gate 134 enables driver circuit 136 to switch ON transistor 120 thereby enabling charging of the backup battery. The output of gate 134 is also ORed with the high current signal 42 by OR gate 138, thus causing the control circuits to operate the first voltage multiplier 20 in the high current mode when transistor 120 is ON and the backup battery is charging.

In operation, the decoder generates a charge enable signal 132 which causes the backup battery to charge from node 110 through transistor 120 until either the charge enable signal is removed, or the backup battery reaches a voltage between 3.0 and 3.1 volts, wherein the hysteresis action of comparator 130 controls. The hysteresis voltages are shown by lines 210 and 220 of FIG. 3. Note that the second voltage multiplier is capable of delivering approximately 750 μA of charging current in this zone. Eventually, the backup battery reaches a limited charged voltage of 3.1 volts.

Figure 4:
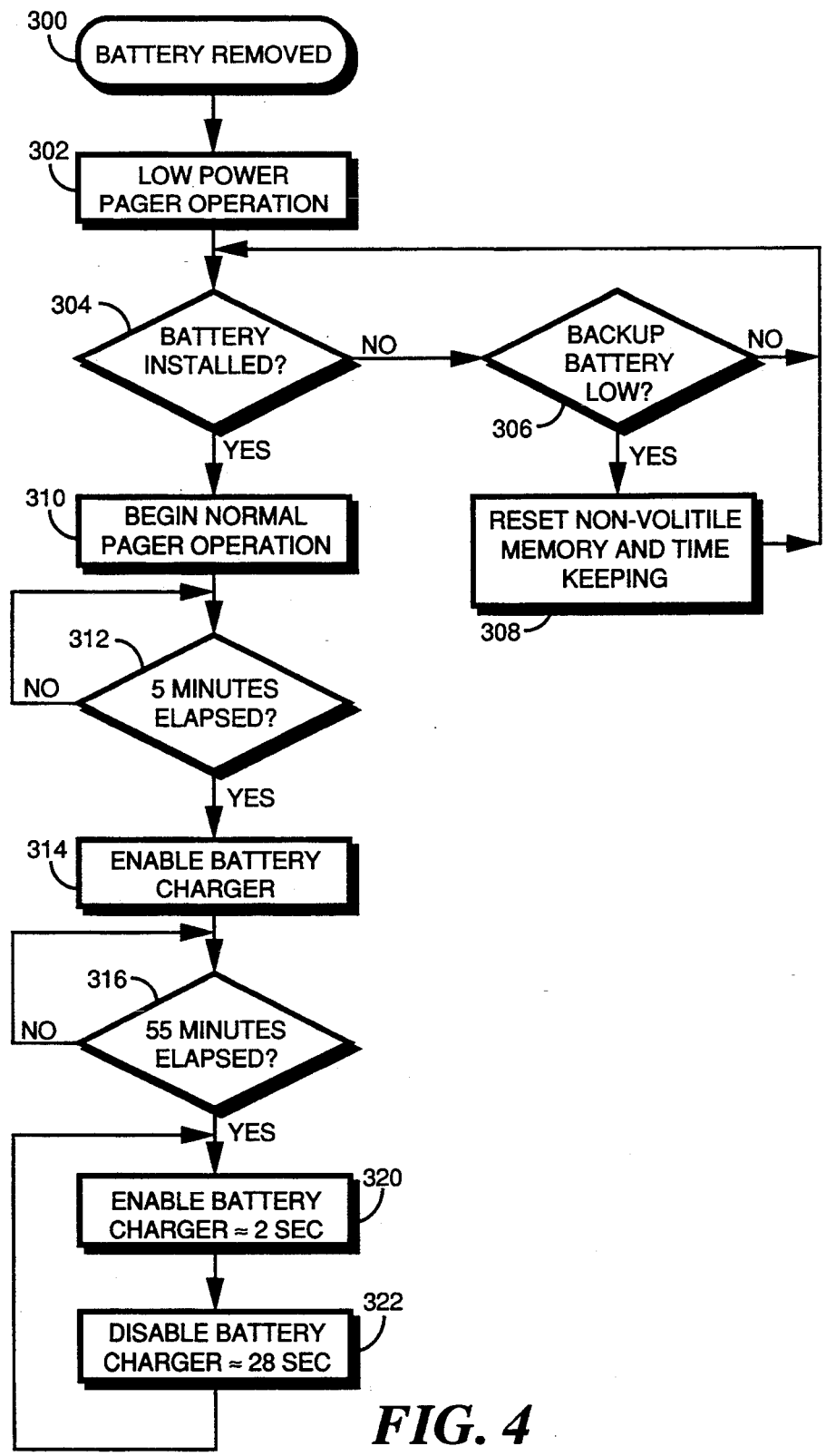
FIG. 4 shows a flow chart representing to operation of the battery charging system of the present invention.

FIG. 4 shows a flow chart representing the operation of the battery charging system. The flow chart is implemented by decoder 40. Step 300 represents normal paging operations being interrupted by the occurrence of an absent signal 64, from the battery absent detector 60. In response, step 302 shows the pager operating in a low power mode. The low power mode includes no activity of receiver 45, and limited or no operation of display 48, but includes retention of message information stored in volatile memory as well as maintenance of time keeping functions. Steps 304 and 306 indicate that the pager remains in the low power mode until either a good primary battery is installed or the backup battery voltage becomes low. If in step 306 the backup battery voltage becomes low, less than 2.2 volts, the information in volatile memory is erased and the time keeping functions are reset by step 308. When in step 304 a primary battery is installed, step 310 causes normal pager operation to begin. Normal paging operations include message reception, decoding, alerting and displaying, as well as battery saving and low battery functions. If step 308 was not executed, the message and time information will be maintained. Normal pager operation continues through the duration of the flow chart until again a battery absent signal is generated and step 300 is executed. The remaining steps indicate the operation of the battery charging system. For the first five minutes after the installation of a primary battery the battery charging system is not enabled, step 312. Since the battery charging draws relatively high current from the primary battery during initial charging, the charging current may interfere with measurement of other paging currents both in testing and trouble shooting environments with test equipment 150 coupled to the pager. Also charging of the backup battery may generate radio interference which also interferes with testing and troubling shooting of the receiver section with test equipment 150. Step 312 disables charging for the first five minutes after installation of a primary battery or alternate power from test fixture 150 in order to provide for activities such as testing and trouble shooting without interference from the charging circuit.

After five minutes have elapsed, steps 314 and 316 operate to generate charge enable signal 132, thereby enabling battery charging for 55 minutes. During this time, the backup battery charges up to 3.1 volts and then moves between 3.0 and 3.1 volts in response to the hysteresis action of comparator 130. The charging being disabled as the voltage decays from 3.1 to 3.0 and then enable as the voltage rises from 3.0 to 3.1 with substantially 750 $\mu$A of charging current, see range 225 of FIG. 3. Eventually the voltage of the backup battery stabilizes to a charged voltage of 3.1. After 55 minutes have elapsed, steps 320 and 322 work to maintain the voltage on the backup battery by enabling the charging circuits substantially every 2 seconds and disabling the charging circuits substantially every 28 seconds. Steps 320 and 322 not only reduce any current wasted on trickle charging resulting from charging the backup battery with a resistor, such as resistor 52 in FIG. 1, but also protects against extremely rapid discharge of the primary battery in event of a shorted backup battery. If the backup battery were connected to the charging source 100% of the time and the backup battery failed, the amount of power the second voltage multiplier is capable of delivering to the backup battery would rapidly deplete the power in the primary battery. The values of 5 and 55 minutes, and 2 and 28 seconds may be varied while remaining within the spirit and scope of the invention.

In an alternate application, the voltage limits 210 and 220 of FIG. 3 may be set lower than the regulated voltage of node 30. While still providing for rapid charging of backup battery 50, the reduced backup voltage is capable of preserving low voltage functions of decoder 40, such as preserving memory and time keeping functions. By charging backup battery 50 to a lower voltage, power from the primary battery 10 consumed for the purpose of recharging the backup battery 150 is conserved, thereby increasing the life of the primary battery.

Figure 5:
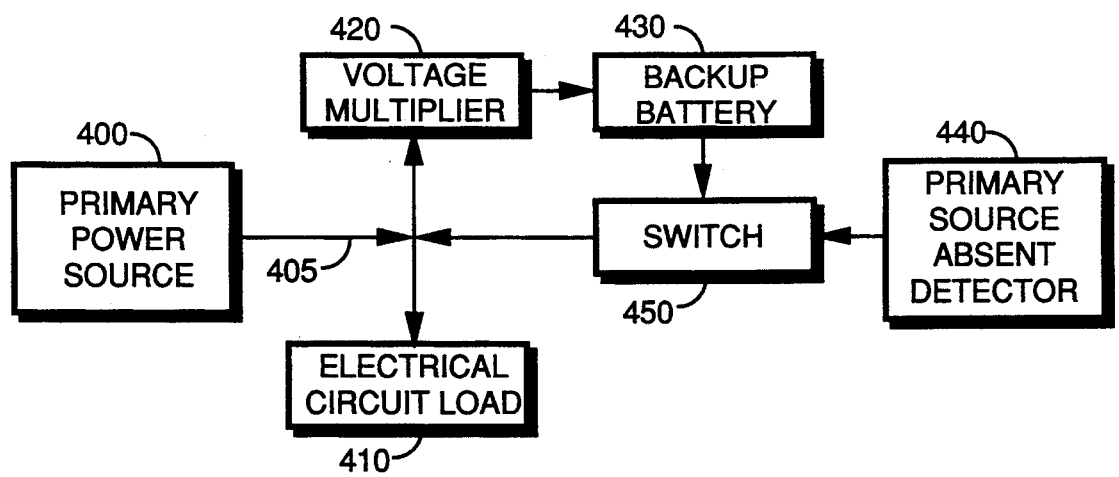
FIG. 5 shows a block diagram of a second embodiment of the present invention.

FIG. 5 shows a block diagram of an alternate embodiment of the present invention. The invention may be comprised within a portable electronic device such as a pager. In this embodiment, voltage multiplier power for recharging the backup battery is drawn from the same voltage source used to power the load to be powered by the backup battery. Primary power source 400 supplies an output voltage 405 which is preferably regulated. The primary power source may comprise a primary battery, or may comprise primary battery 10 and voltage multiplier 20 of FIG. 1. The output voltage drives an electrical circuit load including decoder 410 which could correspond to means 40, 45 and 48 of FIG. 1. Output voltage 405 also powers a voltage multiplier 420 which may be similar to the second voltage multiplier of FIG. 2, or a common boost mode voltage multiplier such as the MAX631 manufactured by Maxim Integrated Products. The output of the voltage multiplier is used to charge a backup battery 430 which may correspond to backup battery 50 of FIG. 1. And similar to the description with respect to FIG. 1, backup battery 450 is coupled to node 405 through switch 450, which may correspond to transistor 62 of FIG. 1, in response to primary source absent detector 440 detecting the absence of power from the primary power source. As with the backup battery charging system of FIG. 2, voltage multiplier 420 allows for rapid charging of the backup battery to a voltage equal to or greater than the output voltage of the primary power source. Charging to a greater voltage also allows extended operation of the electrical circuit means 410 in the absence of power from the primary power source 400. Absence of power from the primary power source may be caused by either depletion of power within or removal of a battery contained with the primary power source.

In summary, during backup operation, the backup battery system of the present invention increases backup battery voltage range (3.1 to 2.2 volts instead of 2.6 to 2.2 volts) before backup operations are terminated by the decoder and important information is destroyed. This improved range increases the time a pager can operate in the backup mode and increases the electrical functionality while the device is operating from the backup battery. Also, charging the backup battery to a higher voltage provides for substantially more energy storage in the backup battery. Also, the backup battery charging system rapidly recharges the backup battery from the primary battery. And, for a predetermined time after installation of a primary power source, the backup system does not interfere with the measurement of operating parameters of the device, such as measurement of current drain or radio characteristics.

I claim:

1. In an electrical device having a removable direct current power source and a rechargeable power source, a method comprising steps of:
   determining installation of the removable direct current power source, wherein installation of the removable direct current power source may induce a temporary transient condition;
   delaying a predetermined time after said step of determining, the predetermined time being substantially longer than the temporary transient condition; and, charging the rechargeable power source with power from the removable direct current power source after said step of delaying.

2. The method of claim 1 wherein said step of delaying further includes a step of measuring electrical parameters of the electrical device, thereby providing measurement of the electrical parameters without electrical interference from said step of charging.

3. The method of claim 2 wherein said removable direct current power source comprises a test fixture for measuring electrical parameters of the electrical device.

4. The method of claim 1 wherein the removable direct current power source comprises a primary battery, and the rechargeable power source includes a rechargeable battery fixed within the electrical device.

5. The method of claim 1 wherein the electrical device comprises a portable selective call receiver.

6. An apparatus comprising:
   first voltage multiplying means for coupling to a primary power source having a primary voltage, said first voltage multiplying means for increasing the voltage from a primary power source to provide a regulated voltage having a magnitude greater than a magnitude of the primary voltage;
   second voltage multiplying means coupled to the primary power source, said second voltage multiplying means increasing the voltage from the primary power source to a limited voltage, Wherein a magnitude of the limited voltage is greater than the magnitude of the regulated voltage;
   rechargeable power source coupled to said second voltage multiplying means, said rechargeable power source recharging to a voltage substantially equal to the limited voltage; and
   electrical circuit means selectively powered by said first voltage multiplying means in response to the presence of the primary power source, and selectively powered by said rechargeable power source in response to the absence of the primary power source.

7. The apparatus of claim 6 wherein said apparatus is portable, and said primary power source comprises a removable battery, and said rechargeable power source comprises a rechargeable battery fixed within the apparatus.

8. The apparatus of claim 6 further comprising a delay means for generating an inhibit signal for a predetermined time in response to an installation of the primary power source, wherein said second voltage multiplying means is inhibited during a duration of the inhibit signal and said first voltage multiplying means is not inhibited during the duration of the inhibit signal.

9. The apparatus of claim 6 wherein said first voltage multiplying means comprises a reactive device for increasing voltage, and wherein said second voltage multiplying means also comprises said reactive device for increasing voltage.

10. The apparatus of claim 9 wherein said reactive device comprises an inductor.

11. The apparatus of claim 9 further wherein said second voltage multiplying means generates a charge signal indicating said rechargeable battery voltage is less than the voltage limit, and said first voltage multiplying means has high power and low power voltage multiplying modes, wherein said first voltage multiplying means operates in a high power mode in response to a presence of the charge signal, or in response to a signal from said electrical circuit means, and otherwise operates in the low power mode.

12. The apparatus of claim 6 said electrical circuit means includes a volatile memory means and time keeping means, and said apparatus further comprising a receiving means for receiving and demodulating radio signals having address and subsequent message information modulated thereon, and said electrical circuit means further comprises a decoding means for selectively processing demodulated radio signals in response to detection of predetermined address contained therein, and for storing subsequent message information in the volatile memory.

13. The apparatus of claim 12 further comprising a display means for displaying time of day information generated by the time keeping means in both the presence and absence of the primary power source.

14. A selective call receiver having a decoder circuit, a primary power source, and a back-up power source, wherein said decoder circuit controls a plurality of selective call receiver functions, and further wherein the primary power source provides power for said selective call receiver and the back-up power source provides back-up power to said selective call receiver in the event that primary power is unavailable, said selective call receiver comprising:
   a first voltage multiplier for receiving a first voltage from said primary power source, said first voltage multiplier boosting the first voltage to a regulated voltage having a magnitude greater than a magnitude of the first voltage;
   a second voltage multiplier for receiving the first voltage and coupled to said first voltage multiplier for providing the back-up power having a voltage magnitude greater than the magnitude of the regulated voltage, said second voltage multiplier providing a charging current to said back-up power source; and
   a power source detector coupled to said decoder and receiving the first voltage, said power source detector detecting when the first power source becomes unavailable and signalling said decoder of an absence of the regulated voltage, said decoder thereafter enabling said back-up power source for supplying the back-up power to said selective call receiver, and wherein said power source absent detector detects a restoration of the regulated voltage and thereafter causing said decoder to delay the charging current to said back-up power source for a predetermined time.

15. The selective call receiver according to claim 14 wherein said selective call receiver operates in a low power mode while powered by the back-up power.

* * * * *